(12) United States Patent
Yamashita et al.

(10) Patent No.: US 9,661,169 B2
(45) Date of Patent: May 23, 2017

(54) ELECTRIC POWER SUPPLYING DEVICE AND IMAGE PROCESSING APPARATUS

(71) Applicants: Tomoyuki Yamashita, Kanagawa (JP); Atsuki Iwata, Tokyo (JP); Takuma Kasai, Kanagawa (JP); Norikazu Okada, Kanagawa (JP); Homare Ehara, Kanagawa (JP); Tetsuya Yano, Kanagawa (JP); Toshimasa Aoki, Kanagawa (JP); Ryohta Kubokawa, Kanagawa (JP); Shuntaroh Nakayama, Kanagawa (JP); Takaaki Shirai, Tokyo (JP)

(72) Inventors: Tomoyuki Yamashita, Kanagawa (JP); Atsuki Iwata, Tokyo (JP); Takuma Kasai, Kanagawa (JP); Norikazu Okada, Kanagawa (JP); Homare Ehara, Kanagawa (JP); Tetsuya Yano, Kanagawa (JP); Toshimasa Aoki, Kanagawa (JP); Ryohta Kubokawa, Kanagawa (JP); Shuntaroh Nakayama, Kanagawa (JP); Takaaki Shirai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/154,845

(22) Filed: May 13, 2016

(65) Prior Publication Data

US 2016/0344885 A1 Nov. 24, 2016

(30) Foreign Application Priority Data

May 18, 2015 (JP) ................................. 2015-101067

(51) Int. Cl.
*H04N 1/00* (2006.01)
*H02J 7/00* (2006.01)

(52) U.S. Cl.
CPC ....... *H04N 1/00893* (2013.01); *H02J 7/0029* (2013.01); *H02J 7/0063* (2013.01); *H04N 1/00899* (2013.01); *H02J 2007/0067* (2013.01); *H04N 2201/0094* (2013.01)

(58) Field of Classification Search
CPC .......... H04N 1/00893; H04N 1/00899; H04N 2201/0094; H02J 7/0063; H02J 7/0029; H02J 2007/0067
See application file for complete search history.

(56) References Cited

U.S. PATENT DOCUMENTS

2013/0169990 A1  7/2013  Yoshioka et al.

FOREIGN PATENT DOCUMENTS

JP       2008-233260       10/2008

*Primary Examiner* — Kent Yip
(74) *Attorney, Agent, or Firm* — Duft Bornsen & Fettig, LLP

(57) ABSTRACT

An electric power supplying device includes a main power supply that supplies electric power to each component of an apparatus, an auxiliary power supply that supplies electric power to an assisted component in the apparatus, the assisted component requiring power supply during start-up time of the apparatus and having a whose start-up time being equal to or longer than a predetermined period of time, a discharging control circuit that controls the auxiliary power supply to cause the auxiliary power supply to output a voltage, the output voltage being lower than a voltage output by the main power supply and being equal to or more than a lower limit voltage of a voltage range that the assisted component is operable, and a power supply prevention circuit that prevents the auxiliary power supply from supplying power to a component other than the assisted component in the apparatus.

6 Claims, 4 Drawing Sheets

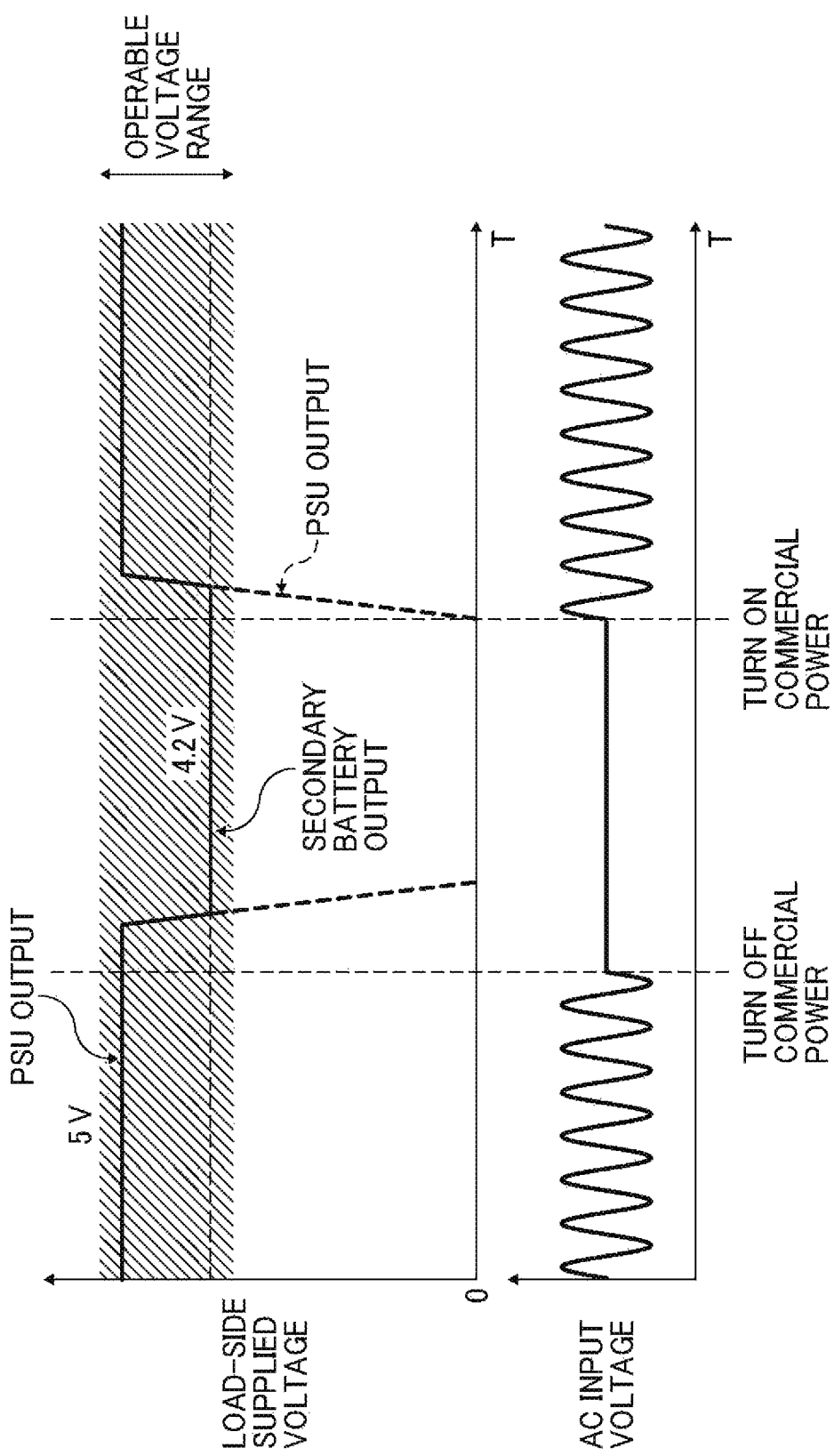

ELECTRIC POWER SUPPLYING DEVICE AND IMAGE PROCESSING APPARATUS

CROSS-REFERENCE TO RELATED APPLICATIONS

This patent application is based on and claims priority pursuant to 35 U.S.C. §119(a) to Japanese Patent Application No. 2015-101067, filed on May 18, 2015 in the Japan Patent Office, the entire disclosures of which are hereby incorporated by reference herein.

BACKGROUND

Technical Field

The present invention relates to an electric power supplying device and an image processing apparatus.

Background Art

With increased computerization of information, image processing apparatuses such as printers and facsimiles used for outputting the computerized information and scanners used for computerizing documents have become indispensable. In most cases, these image processing apparatuses are configured as multifunction peripherals (MFPs) that can be used as a printer, facsimile, scanner, and copier by implementing an image pickup capability, image forming capability, and communication capability, etc.

In these image processing apparatuses, it is demanded to start up quickly from a state that main power source such as commercial power is turned off. To accomplish that demand, it is known to switch a power source that supplies power to an entire controller and a control panel of the image processing apparatus to an auxiliary power supply such as a secondary battery to maintain energy saving mode if a sensor detects that the main power is turned off. The entire controller and the control panel of the image processing apparatus are components required to be started up after the main power of the image processing apparatus is turned on regardless of whether peripheral devices are turned on or turned off

SUMMARY

An example embodiment of the present invention provides a novel electric power supplying device includes a main power supply that supplies electric power to each component of an apparatus, an auxiliary power supply that supplies electric power to an assisted component in the apparatus, the assisted component requiring power supply during start-up time of the apparatus and having a whose start-up time being equal to or longer than a predetermined period of time, a discharging control circuit that controls the auxiliary power supply to cause the auxiliary power supply to output a voltage, the output voltage being lower than a voltage output by the main power supply and being equal to or more than a lower limit voltage of a voltage range that the assisted component is operable, and a power supply prevention circuit that prevents the auxiliary power supply from supplying power to a component other than the assisted component in the apparatus.

Further embodiments of the present invention provide an image processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating a relationship between an input voltage from a power supply unit (PSU) and power supplied to a load side as an embodiment of the present invention.

Figure 1:
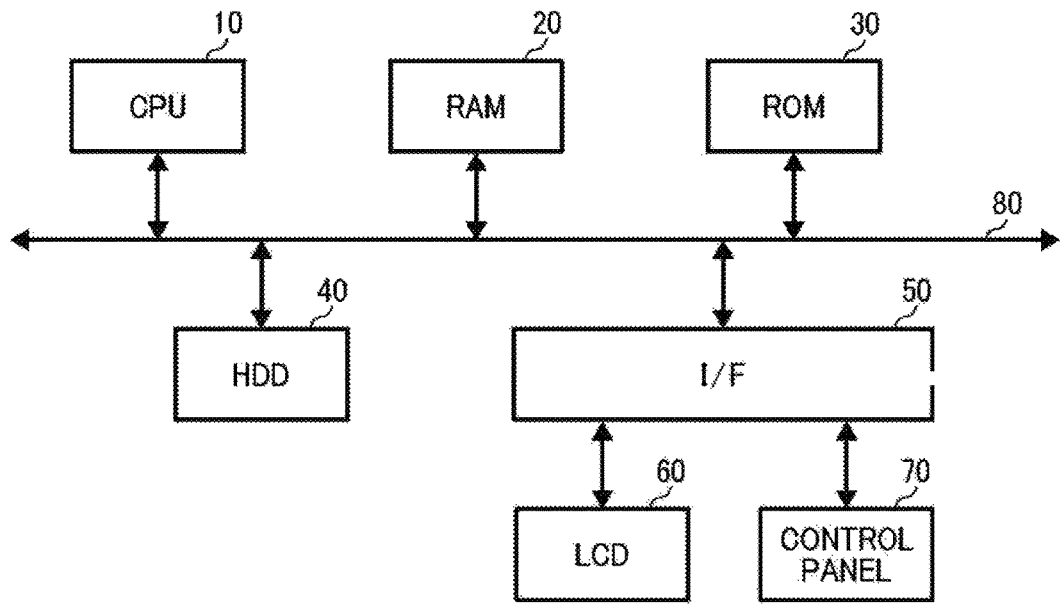
FIG. 1 is a block diagram illustrating a hardware configuration of an image processing apparatus as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

An embodiment is described below in detail with reference to figures.

In the known technology, if the secondary battery supplies power to all components required to be started up when the main power is turned on while the main power is turned off, a large-capacity secondary battery is required, and the sensor detecting that the main power is turned off is also required. The inventors of the present invention have found that, in the known technology, a scale of a configuration to start up quickly from the state that the main power is turned off becomes large.

In the embodiment described below, a simpler configuration that enables the image processing apparatus to start up quickly from the state that the main power is turned off is provided.

In the embodiment described below, the image processing apparatus as a multifunction peripheral (MFP) is described. FIG. 1 is a block diagram illustrating a hardware configuration of the image processing apparatus in this embodiment. As illustrated in FIG. 1, the image processing apparatus in this embodiment includes the same configuration as a general server or personal computer (PC) etc.

That is, in the image processing apparatus 1 in this embodiment, a Central Processing Unit (CPU) 10, a Random Access Memory (RAM) 20, a Read Only Memory (ROM) 30, a hard disk drive (HDD) 40, and an interface (I/F) 50 are connected with each other via a bus 80. In addition, a Liquid Crystal Display (LCD) 60 and an operational unit 70 are connected to the I/F 50.

The image processing apparatus 1 includes a dedicated device that executes forming an image, outputting the image, and scanning. Examples of the dedicated device are a feeding mechanism that feeds paper on which an image is formed and output, a plotter that forms an image on paper, and a scanner that scans an image output on paper. Other than that, the dedicated device can include a dedicated processor that processes images at high speed. For example, the processor described above can be implemented using an Application Specific Integrated Circuit (ASIC).

The CPU 10 is a processor and controls the whole operation of the image processing apparatus 1. The RAM 20 is a volatile memory that can read/write information at high speed and is used as a work area when the CPU 10 processes information. The ROM 30 is a read-only non-volatile memory and stores programs such as firmware. The HDD 40 is a non-volatile memory that can read/write information and stores the OS, various control programs, and application programs etc. In addition to the HDD, semiconductor memory devices such as a Solid State Drive (SSD) can be used.

The I/F 50 connects various hardware and network etc. via the bus 80 to control such hardware and network. The LCD 60 is a visual user interface to allow a user to check status of the image processing apparatus 1. The operational unit 70 is a user interface such as a keyboard, mouse, various hardware buttons, and touch panel to input information to the image processing apparatus.

In this hardware configuration described above, programs stored in storage devices such as the ROM 30, HDD 40, and optical discs are read to the RAM 20, and a software controlling unit is constructed by executing operation in accordance with the programs by the CPU 10. Functional blocks that implement capabilities of the image processing apparatus 1 of this embodiment are constructed by a combination of the software controlling units described above and hardware.

Figure 2:
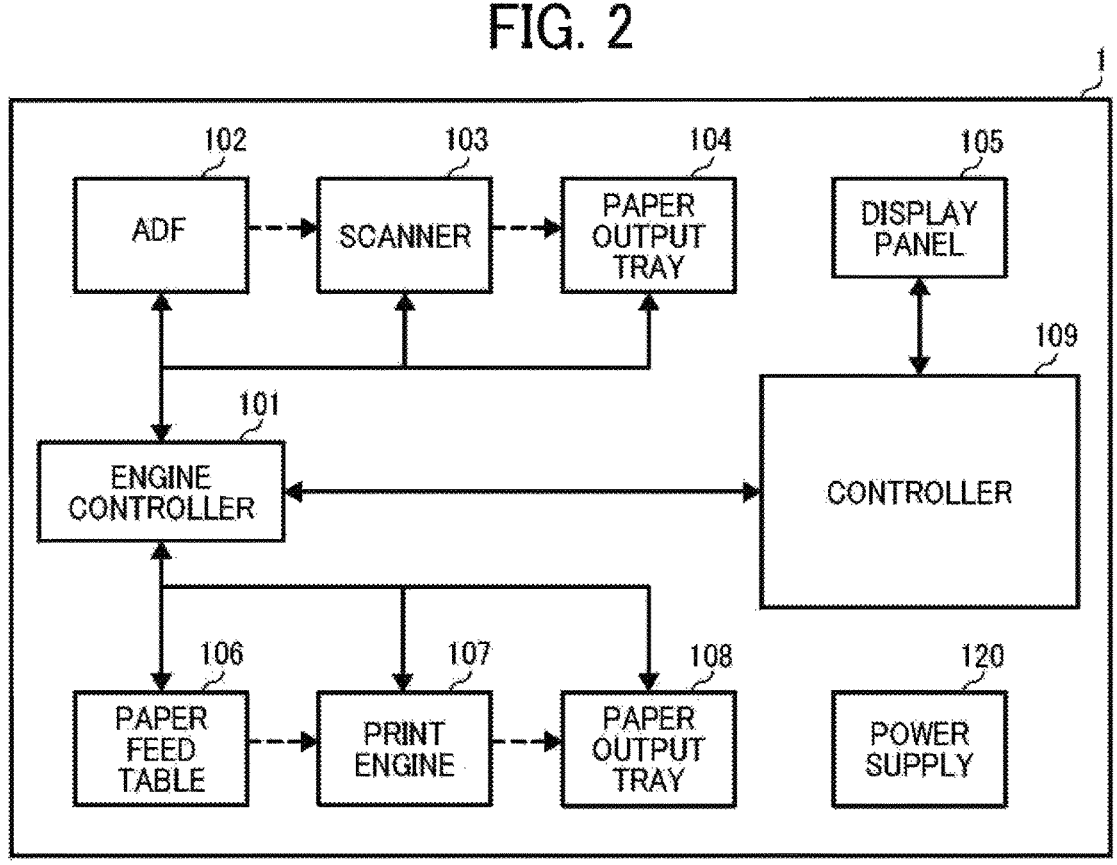
FIG. 2 is a block diagram illustrating a functional configuration of the image processing apparatus as an embodiment of the present invention.

Next, functions of the image processing apparatus 1 in this embodiment are described below. FIG. 2 is a block diagram illustrating a configuration of the image processing apparatus 1 in this embodiment. As shown in FIG. 2, the image processing apparatus 1 includes an engine controller 101, an Auto Document Feeder (ADF) 102, a scanner 103, a paper output tray 104, a display panel 105, a paper feed table (sheet feeding table) 106, a print engine 107, a paper output tray 108, a controller 109, and a power supply 120.

As shown in FIG. 2, the image processing apparatus 1 in this embodiment is constructed as the MFP that includes the scanner unit 103 and the print engine 107. In FIG. 2, solid arrows indicate electrical connections, and dashed arrows indicate flow of paper.

The engine controller 101 controls and drives the scanner 103 and the print engine 107 etc. The ADF 102 transfers a document set to be scanned to the scanner 103 if the image processing apparatus 1 functions as the scanner. The scanner 103 scans the set document under control of the engine controller 101. The document scanned by the scanner 103 is ejected to the paper output tray 104.

The paper feed table 106 feeds set paper to the print engine 107 if the image processing apparatus 1 functions as the printer. The print engine 107 forms an image on the paper fed from the paper feed table 106. As particular examples of the print engine 107, image forming mechanisms such as inkjet method and electrophotography method can be used. After the print engine 107 forms the image on the paper, the paper is ejected on the paper output tray 108.

The display panel 105 is both an output interface that displays status of the image processing apparatus 1 visually and an input interface to operate the image processing apparatus 1 directly or input information to the image processing apparatus 1. That is, the display panel 105 is implemented by the LCD 60 and the control panel 70 in FIG. 1.

The controller 109 combines software and hardware and controls the whole image processing apparatus 1. The power supply 120 supplies electric power to each component of the image processing apparatus 1. The power supply 120 in this embodiment is described in detail below.

Figure 3:
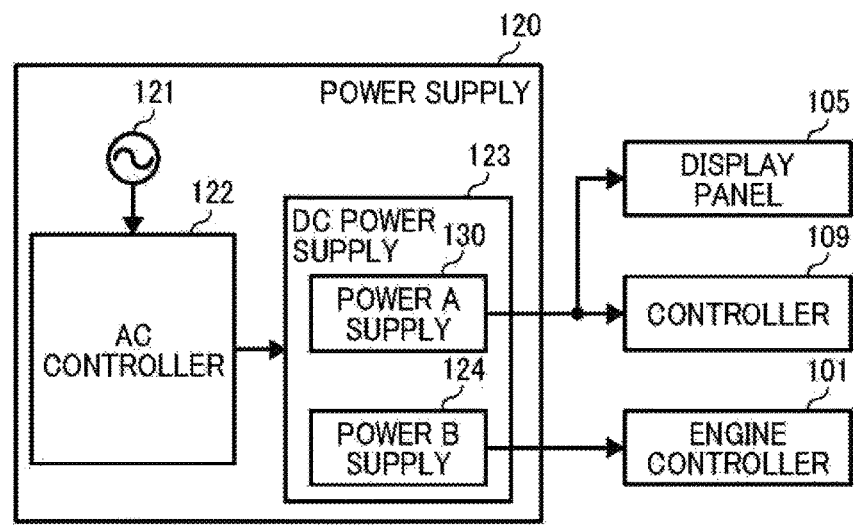
FIG. 3 is a diagram illustrating a configuration of a power supply circuit as an embodiment of the present invention.

FIG. 3 is a diagram illustrating a configuration of the power supply in this embodiment. As shown in FIG. 3, the power supply 120 in this embodiment includes commercial power 121, an alternating current (AC) controller 122, and a direct current (DC) power supply 123. In addition, the DC power supply 123 includes a power A supply 130 and a power B supply 124.

The commercial power 121 supplies electric power to each component of the image processing apparatus 1. The AC controller 122 outputs AC voltage input from the commercial power 121 to the DC power supply 123. The DC power supply 123 converts the AC voltage input from the AC controller 122 into the DC voltage of a power A channel and the DC voltage of a power B channel and outputs the DC voltage of a power A channel to the power A supply 130 and the DC voltage of a power B channel to the power B supply 124 respectively.

The power A channel is the power source that supplies electric power regardless whether the peripheral devices of the image processing apparatus 1 such as the scanner 103 and the print engine 107 are turned on or off. For example, the power A supply 130 supplies the DC voltage converted by the DC power supply 123 to components in the power A channel such as the display panel 105 and the controller 109.

The power B channel is the power source that supplies electric power after the peripheral devices of the image processing apparatus 1 such as the scanner 103 and the print engine 107 are turned on. For example, the power B supply 124 supplies the DC voltage converted by the DC power supply 123 to components in the power B channel such as the engine controller 101 that controls the peripheral devices such as the scanner 103 and the print engine 107 etc. If the power B supply 124 supplies power to the engine controller 101, the electric power is supplied to the peripheral devices such as the ADF 102, the scanner 103, and the print engine 107 etc. that are controlled by the engine controller 101.

In the image processing apparatus 1 described above, if the commercial power 121 is turned off and turned on again, it is demanded to supply power to each component of the image processing apparatus 1 and start up quickly. Especially, since the components supplied power by the power A channel operate regardless whether the peripheral devices are turned on or off, it is demanded that those components starts up quickly after the commercial power 121 is turned on.

Figure 4:
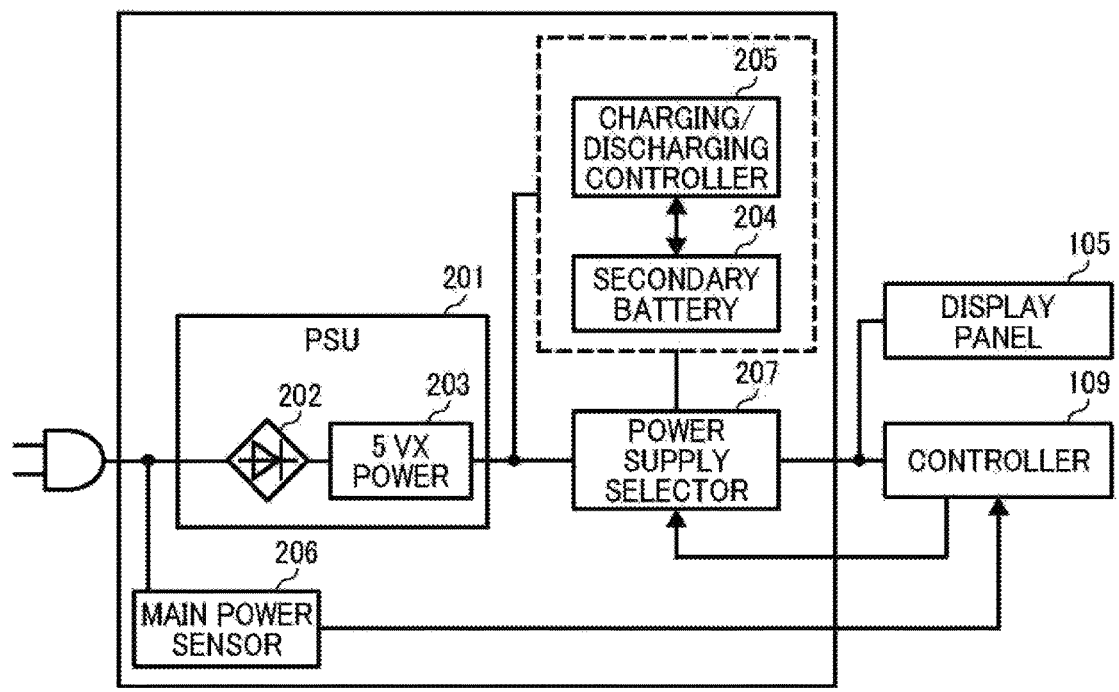
FIG. 4 is a diagram illustrating a configuration of a known power supply circuit in comparison with a power supply circuit as an embodiment of the present invention.

In this case, in comparison with the power A supply 130 in this embodiment, a configuration of a known power A supply that starts up components supplied power by the power A channel quickly is described below. FIG. 4 is a diagram illustrating a configuration of the known power A supply. As shown in FIG. 4, the known power A supply includes a PSU 201 including a rectifying circuit 202 and a 5VX power line 203, a secondary battery 204, a charging/discharging controller (control circuit) 205, a main power sensor 206, and a power supply selector 207.

The 5VX power line 203 is a power line in the power A channel, and the secondary battery 204, the charging/discharging controller 205, the main power sensor 206, and the power supply selector 207 are connected to the 5VX power line 203. The main power sensor 206 detects whether the commercial power 121 is turned on or off by detecting whether or not the electric power is supplied from the commercial power 121. The main power sensor 206 outputs a detecting result to the controller 109.

The controller 109 controls the power supply selector 207 in accordance with the detecting result input from the main power sensor 206. More specifically, the controller 109 controls that the power supply selector 207 switches so that the PSU 201 supplies power if the detecting result indicates that the commercial power 121 is turned on. By contrast, the controller 109 controls that the power supply selector 207 switches so that the secondary battery 204 supplies power if the detecting result indicates that the commercial power 121 is turned off. It should be noted that the controller 109 turns off the power supply selector 207 if the detecting result indicates that the commercial power 121 is turned off and charge remaining of the secondary battery 204 is zero.

The power supply selector 207 switches the power supply into either the PSU 201 or the secondary battery 204 under control of the controller 109. As a result, if it is switched to cause the PSU 201 supply power, the PSU 201 supplies electric power to the display panel 105 and the controller 109. By contrast, if it is switched to cause the secondary battery 204 supply power, the secondary battery 201 supplies electric power to the display panel 105 and the controller 109. It should be noted that the electric power is not supplied to the display panel 105 and the controller 109 if the power supply selector 207 is turned off.

The secondary battery 204 is charged by supplying power from the PSU 201 and discharged if the power supply selector 207 switches so that the secondary battery 204 supplies power to supply power to the display panel 105 and the controller 109. The charging/discharging controller 205 controls charging and discharging the secondary battery 204.

By adopting the configuration described above, even if the commercial power 121 is turned off, the energy saving state that the secondary battery 204 supplies power to the display panel 105 and the controller 109 is maintained. As a result, when the commercial power 121 starts up from the off-state, the components in the power A channel can start up quickly.

In the configuration of the known power A channel, the secondary battery 204 supplies power to the multiple components such as the display panel 105 and the controller 109 etc. in the energy saving state, and it is possible to shorten time from the energy saving state to the operating state. However, since time consumed with starting up varies for each component that the secondary battery 204 supplies power, it is necessary to wait until all of those components start up even if those components maintain the energy saving state.

For example, assuming it takes 30 seconds for the display panel 105 to start up from the energy saving state and 15 seconds for the controller 109 to start up from the energy saving state, it is impossible to use the image processing apparatus until the display panel 105 finishes starting up even if the controller 109 starts up quicker. As described above, in the configuration of the known power A channel, since the components (e.g., the controller 109) that are unnecessary to have power supply are also supplied from the secondary battery 204, it is required to use the large-capacity secondary battery 204. In addition, in the configuration of the known power A channel, it is required to include the main power sensor 206 separately. As a result, the configuration scale of the known power A channel becomes large.

To cope with this issue, this embodiment implements a simpler configuration for starting up quickly from the state that the main power of the image processing apparatus 1 is turned off.

Figure 5:
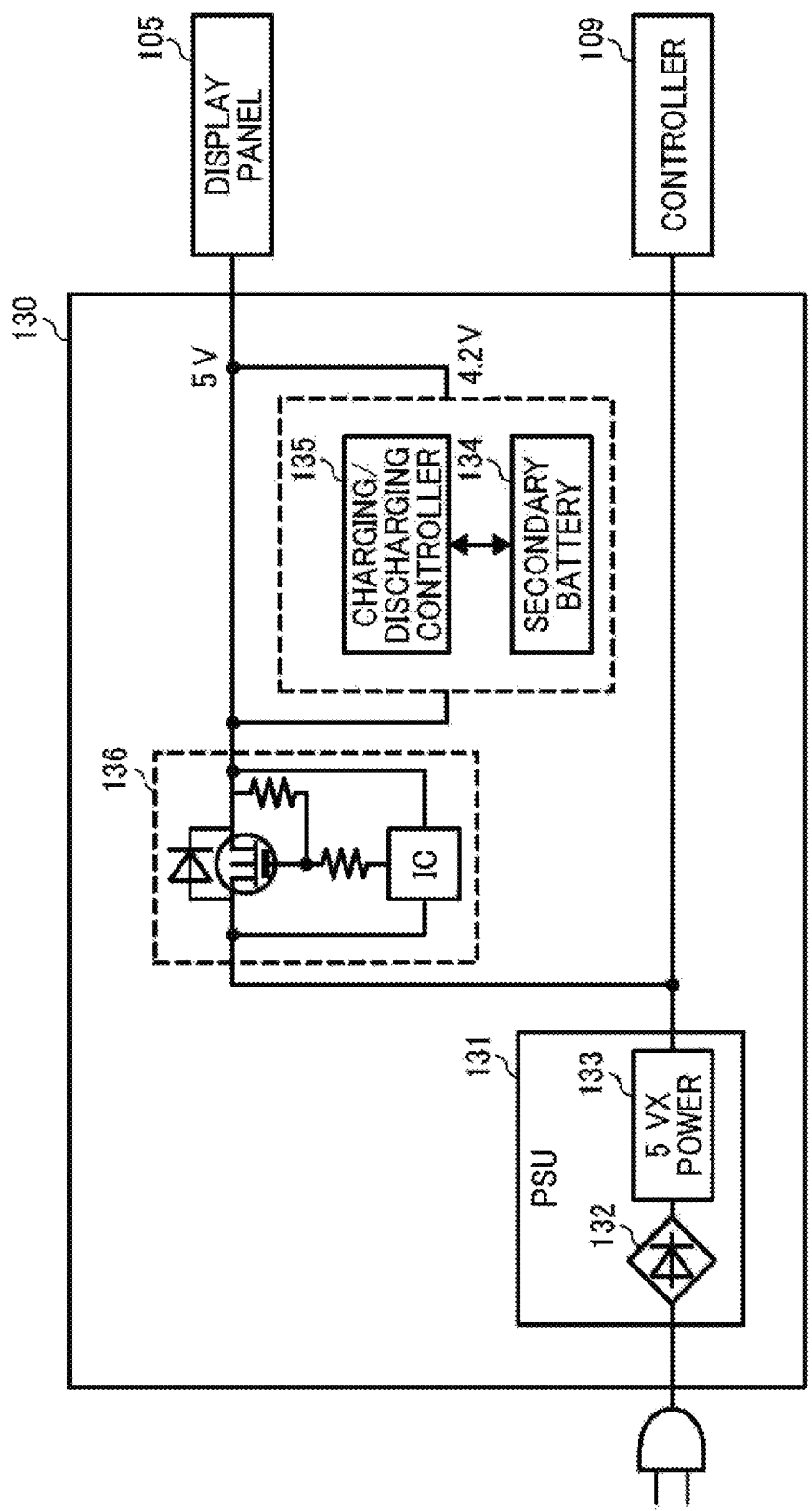
FIG. 5 is a diagram illustrating a configuration of the power supply circuit as an embodiment of the present invention.

FIG. 5 is a diagram illustrating a configuration of the power A supply 130 in this embodiment. As shown in FIG. 5, the power A supply 130 in this embodiment includes a PSU 131 including a rectifying circuit 132 and a 5VX power line 133, a secondary battery 134, a charging/discharging controller (control circuit) 135, and a backflow prevention circuit 136.

While the configuration of the PSU 131 is similar to the PSU 201 in FIG. 4, the controller 109 and the backflow prevention circuit 136 are connected to the 5VX power line 133. The secondary battery supplies power only to components whose start-up time is longer than a predetermined period of time. That is, the secondary battery 134 functions as an auxiliary power supply that supplies power to components to be assisted in the power A channel, i.e., which are needed to be supplied with power in the start-up time of the apparatus, and whose start-up time is longer than the predetermined period of time. In this embodiment, the secondary battery 134 only supplies power to the display panel 105 (an assisted component) that needs 30 seconds to start up from the energy saving state.

The charging/discharging controller 135 controls charging the secondary battery 134 by supplying power from the PSU 131. In addition, the charging/discharging controller 135 controls so that the secondary battery 134 always outputs (discharges) a constant voltage (e.g., 4.2 V) lower than the voltage output by the commercial power 121 (e.g., 5 V) and equal to or higher than a lower limit voltage of a voltage range that the display panel 105 is operable. That is, the charging/discharging controller 135 functions as a discharge controller that controls discharging the secondary battery 134. As a result, the secondary battery 134 has a capacity that is only sufficient to supply a constant voltage (e.g., 4.2 V) to the display panel 105.

The backflow prevention circuit 136 includes a Field Effect Transistor (FET) and an Integrated Circuit (IC). The backflow prevention circuit 136 prevents the electric power from being supplied to a component other than the display panel 105 that the secondary battery 134 supplies power (i.e., the controller 109 in this embodiment). That is, the backflow prevention circuit 136 functions as a power supply prevention circuit preventing the secondary battery 134 as the auxiliary power supply from supplying power to components other than the assisted components (e.g., the display panel 105 etc.).

More specifically, the backflow prevention circuit 136 monitors a voltage input from the PSU 131 and a voltage output by the secondary battery 134 under control of the IC circuit, and the backflow prevention circuit 136 turns off the FET if the voltage input from the PSU 131 becomes lower than the voltage output by the secondary battery 134. That is, the backflow prevention circuit 136 implements a switching element that turns off the FET and stops supplying power from the auxiliary power supply to the components other than the assisted components if the voltage output by the main power supply becomes equal to or lower than the predetermined voltage.

FIG. 6 is a diagram illustrating a relationship between an input voltage from the PSU 131 and power supplied to the display panel 105 (the load side) in this embodiment. As shown in FIG. 6, the lower graph indicates the voltage input from the PSU 131, and the horizontal axis indicates time and the vertical axis indicates the AC input voltage. In addition, the upper graph indicates the electric power supplied to the load side. The horizontal axis indicates the voltage supplied to the load side, and the area with hatched lines indicates a voltage range that the load side is operable.

As shown in FIG. 6, in the upper graph, the output voltage of 5 V from time 0 is the input voltage from the PSU 131 and decays gradually after the commercial power 121 is turned off. In addition, as shown in FIG. 6, the output voltage of 4.2 V is input from the secondary battery 134 and always constant. The electric power of the output voltage illustrated with the solid lines in FIG. 6 is output to the load side, and the electric power of the output voltage illustrated with the broken lines in FIG. 6 is not supplied to the load side.

As shown in FIG. 6, after the commercial power 121 is turned off and the output voltage by the input voltage from the PSU 131 decreases to become lower than the output voltage from the secondary battery 134, the electric power supplied to the load side is switched to the output voltage from the secondary battery 134. After that, if the commercial power 121 is turned on again and the output voltage by the input voltage from the PSU 131 rises to become higher than the output voltage from the secondary battery 134, the electric power supplied to the load side is switched to the output voltage from the PSU 131.

As described above, in the image processing apparatus 1 in this embodiment, since it is required that the secondary battery 134 only supplies power to the assisted components whose rising time is equal to or more than the predetermined period of time, it is possible that the capacity of the secondary battery 134 can be smaller compared to the known technologies. In addition, in the image processing apparatus 1 in this embodiment, if the commercial power 121 is turned on, the PSU 131 supplies power to the assisted components. If the commercial power 121 is turned off and the output voltage decreases, the secondary battery 134 supplies power to the assisted components.

In the image processing apparatus 1 in this embodiment, instead of adding the main power sensor 206 in FIG. 4, it is possible to switch between the power supplied from the PSU 131 and the power supplied from the secondary battery 134 in accordance with the output voltage. As a result, in this embodiment, it is possible to implement the image processing apparatus that starts up quickly from the state that the main power is turned off with the simpler configuration. In addition, in this embodiment, it is unnecessary to include the large-capacity secondary battery 134 or the sensor, thus reducing manufacturing cost and reducing power consumption since electric power to operate the sensor is unnecessary.

In this embodiment, the case that the backflow prevention circuit 136 includes the FET is described as the example. By using the FET in the backflow prevention circuit 136, it is possible to prevent the increase in cost for modifying the PSU 131 due to the voltage drop just like using a diode, and it is possible to prevent a restriction on the load side. However, it is not always necessary to use the FET in the backflow prevention circuit 136, and it is possible to user the diode in the backflow prevention circuit 136.

In addition, in this embodiment, the charging/discharging controller 135 controls so that the secondary battery 134 always outputs the constant voltage lower than the output voltage from the PSU 131 and equal to or higher than the lower limit of the voltage range that the load side is operable. Other than that, it is possible that the charging/discharging controller 135 controls so that the secondary battery 134 always outputs the lower limit voltage of the voltage range that the load side is operable. By adopting the configuration described above, it is possible to lower the output voltage from the secondary battery 134, and it is possible to further lower the capacity of the secondary battery 134.

In addition, in this embodiment, the charging/discharging controller 135 can include a latch-stopping overcurrent detection circuit. The latch-stopping overcurrent detection circuit detects that a state of overcurrent that the amount of current flowing from the secondary battery 134 to the load side exceeds a predetermined value continues equal to or longer than a predetermined period of time. For example, the overcurrent state occurs when the commercial power 121 is turned off accidentally such as the power source plug is pulled out and blackout occurs or a trouble occurs in the load side.

If the latch-stopping overcurrent detection circuit detects the overcurrent state, the charging/discharging controller 135 stops discharging from the secondary battery 134 until a predetermined condition is satisfied (e.g., a predetermined period of time elapses after the overcurrent state is canceled). As a result, it is possible to prevent the secondary battery 134 from dying extraordinarily and shorting its useful life.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:
1. An electric power supplying device, comprising:
a main power supply to supply electric power to each component of an apparatus;
an auxiliary power supply to supply electric power to an assisted component in the apparatus, the assisted component requiring power supply during start-up time of the apparatus and having a start-up time being equal to or longer than a predetermined period of time;
a discharging control circuit to control the auxiliary power supply to cause the auxiliary power supply to output a voltage, the output voltage being lower than a voltage output by the main power supply and being equal to or more than a lower limit voltage of a voltage range that the assisted component is operable; and a power supply prevention circuit to prevent the auxiliary power supply from supplying power to a component other than the assisted component in the apparatus.

2. The electric power supplying device according to claim 1, wherein the power supply prevention circuit is a switching element that stops supplying power from the auxiliary power supply to the component other than the assisted component in the apparatus if the voltage output from the main power supply is equal to or less than a predetermined voltage.

3. The electric power supplying device according to claim 1, wherein the discharging control circuit controls the auxiliary power supply so as to cause the auxiliary power supply to output the lower limit voltage of the voltage range that the assisted component is operable.

4. The electric power supplying device according to claim 1, wherein the discharging control circuit controls the auxiliary power supply so as to cause the auxiliary power supply to stop supplying power if a current flowing from the auxiliary power supply is equal to or more than a predetermined value.

5. The electric power supplying device according to claim 1, wherein the assisted component includes a control panel that allows a user operation on the apparatus.

6. An image processing apparatus, comprising the electric power supplying device according to claim 1.

* * * * *